(12) United States Patent
Harris

(10) Patent No.: US 8,667,230 B1
(45) Date of Patent: Mar. 4, 2014

(54) RECOGNITION AND RECALL MEMORY

(76) Inventor: Curtis L. Harris, Albuquerque, NM (US)

( * ) Notice: Subject to any disclaimer, the term of this patent is extended or adjusted under 35 U.S.C. 154(b) by 601 days.

(21) Appl. No.: 12/907,618

(22) Filed: Oct. 19, 2010

(51) Int. Cl.
*G06F 12/00* (2006.01)
*G10L 15/00* (2013.01)

(52) U.S. Cl.
USPC ............. 711/150; 711/104; 711/148; 706/20; 704/243

(58) Field of Classification Search
None
See application file for complete search history.

(56) References Cited

U.S. PATENT DOCUMENTS

| | | |
|---|---|---|
| 3,358,270 A | 12/1967 | Crew et al. |
| 4,094,001 A | 6/1978 | Miller |
| 4,371,948 A | 2/1983 | Chadra |
| 4,451,901 A | 5/1984 | Wolfe et al. |
| 4,531,201 A | 7/1985 | Skinner, Jr. |
| 4,625,295 A | 11/1986 | Skinner |
| 4,747,072 A | 5/1988 | Robinson et al. |
| 4,760,523 A | 7/1988 | Yu et al. |
| 5,051,947 A | 9/1991 | Messenger et al. |
| 5,245,262 A | 9/1993 | Moody et al. |
| 5,437,050 A | 7/1995 | Lamb et al. |
| 5,469,549 A | 11/1995 | Simpson et al. |
| 5,710,775 A | 1/1998 | Nakayasu |
| 7,392,229 B2 | 6/2008 | Harris et al. |
| 7,487,131 B2 | 2/2009 | Harris et al. |
| 7,774,286 B1 | 8/2010 | Harris |
| 8,065,249 B1 | 11/2011 | Harris et al. |
| 2002/0015533 A1 | 2/2002 | Nakamura et al. |
| 2002/0032670 A1 | 3/2002 | Watanabe et al. |
| 2002/0059152 A1 | 5/2002 | Carson et al. |
| 2002/0125500 A1 | 9/2002 | Mattausch et al. |
| 2002/0168100 A1 | 11/2002 | Woodall |
| 2003/0014240 A1 | 1/2003 | Navoni et al. |
| 2003/0055799 A1 | 3/2003 | Starzyk |
| 2003/0194124 A1 | 10/2003 | Suzuki et al. |
| 2003/0229636 A1* | 12/2003 | Mattausch et al. ................ 707/6 |
| 2004/0080973 A1 | 4/2004 | Ogura |
| 2004/0123071 A1 | 6/2004 | Stefan et al. |
| 2004/0156546 A1 | 8/2004 | Kloth |
| 2004/0250013 A1 | 12/2004 | Ogura |
| 2005/0049984 A1* | 3/2005 | King ............................... 706/26 |
| 2005/0154802 A1* | 7/2005 | Kravec et al. ................... 710/33 |
| 2005/0257025 A1 | 11/2005 | Spencer |

OTHER PUBLICATIONS

Genov, et al., "Kerneltron: Support Vector Machine in Silicon," IEEE Transactions on Neural Networks, vol. 14, No. 5 (Sep. 2003), pp. 1426-1433.

Genov, et al., "Silicon Support Vector Machine with On-Line Learning," International Journal of Pattern Recognition, vol. 17 No. 3, World Scientific Publishing Company (2003), pp. 385-404.

(Continued)

*Primary Examiner* — Gary Portka
(74) *Attorney, Agent, or Firm* — Kilpatrick Townsend & Stockton LLP; Kenneth R. Allen

(57) ABSTRACT

A digital memory architecture for recognition and recall in support of a host comprises a plurality of pattern processors, each of which has its own random access memory (RAM) and controller, an external data bus and external data bus controller, a results bus and results bus controller, an internal data bus and internal data bus controller, and an external control bus and external control bus and controller. Each of the pattern processors may be a general purpose set theoretic processor (GPSTP) operating in interrupt and block modes.

13 Claims, 2 Drawing Sheets

(56) References Cited

OTHER PUBLICATIONS

Hasan et al., "A VLSI BAM Neural Network Chip for Pattern Recognition Applications," 1995 IEEE International Conference on Neural Networks Proceedings, IEEE, Part vol. 1, New York, NY (1995), pp. 164-168.

Kurogi, et al., "Multilayered and Columnar Competitive Networks for Spoken Word Recognition," Proceedings of the 19th International Conference on Neural Information Processing (ICONIP'02), vol. 5, Wang, et al., Editors (2002), pp. 2223-2227.

Matshubishi, et al., "A Vector Digital Processor LSI for Speaker-Independent Voice Pattern Matching," IEEE 1991 Custom Integrated Circuits Conference (1991), pp. 16.4.1-14.4.4.

Ogawa, et al., "A General-Purpose Vector-Quantization Processor Employing Two-Dimensional Bit-Propagating Winner-Take-All," 2002 Symposium on VLSI Circuits, Digest of Technical Papers, IEEE, Piscataway, NJ (2002), pp. 244-247.

Raghavendra et al., "A Technique for Micro Rollback Self Recovery Synthesis" IEEE Transactions on Computer-Aided Design of Integrated Circuits and Systems vol. 14, No. 9, Sep. 1995, pp. 1171-1179.

Stormon, "The Coherent Processor TM an Associative Processor Architecture and Applications", COMPCON Spring'91, Digest of Papers, IEEE Cput. Soc. Press, Los Alamitos, CA (1991), pp. 270-275.

Tsai, et al., "Optimal Speed-Up Parallel Image Template Matching Algorithms of Proccesor Arrays with a Reconfigurable Bus System," Computer Vision and Image Understanding, vol. 71, No. 3 (1998), pp. 393-412.

Yamashita, et al., "A Integrated Money Array Processor with a Synchronous-DRAM Interface for Real-Time Vision Applications," Proceedings of the 13th International Conference on Pattern Recognition, IEEE Comput. Soc. Press, Part vol. 4, Los Alamitos, CA. (1996), pp. 575-580.

Chu K., et al., "VLSI Architectures for High Speed Recognition of Context-Free Languages and Finite-State Languages", IEEE, pp. 43-49, 1982.

Johnson S., et al., "Matrix Multiplication on Boolean Cubes Using Generic Communication Primitives", Yale University, pp. 1-50, Sep. 1987.

Manner R., et al., "Real-Time Pattern Recognition, by Massive Parallel Systolic Processors", pp. 1-18, Nov. 23, 1995.

Mostafavi M., et al., "A Parallel Processor ASIC for Real Time Pattern Recognition", IEEE, pp. 306-309, 1990.

Neschen M., "CUMULUS—A Scalable Systolic Array for Binary Pattern Recognition and Networks of Associates", LIX Technical Report, pp. 1-13, 1993.

Shmerko V. et al., "Algorithms of Boolean Differential Calculus for Systolic Processors", Kibernetika, No. 3 pp. 31-40, May-Jun. 1990.

Non-Final Office Action of Feb. 17, 2011 for U.S. Appl. No. 11/871,885, 15 pages.

\* cited by examiner

RECOGNITION AND RECALL MEMORY

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to computer architecture and more specifically to a memory architecture for recognition and recall in support of a host system, such as a central processing unit and host system interface. The memory architecture is useful for real-world applications such as machine vision and real-time-noisy environment-multiple-speaker voice understanding.

Depending upon lighting conditions, a scene or structure will present distinguishable appearances. Fore example, a tree viewed at dawn, early morning, mid-morning, mid-day, early afternoon, and at dusk has a different appearance at each viewing, but it is recognizably the same tree. Not only do the direction, color, and intensity of lighting change, a myriad of changes to leaves, perhaps flowers, occur as well. Wind conditions may result in differing motions, may even alter the overall shape of the tree. But the tree is still recognizable. In order for this to be so, the perceptual mechanism must abstract a concept of the tree isolating those properties that remain the same and ignoring those that change. The changes may be large, e.g. lighting changes, or miniscule, e.g., change of position of a single leaf. Visual perception is one of many functions that require the ability to attend to just "essence" of things while ignoring unimportant aspects.

The General Purpose Set Theoretic Processor (GPSTP), described in U.S. Pat. Nos. 7,392,229, 7,487,131 B2, and 7,774,286 B1, is capable of supporting the processes for extracting an essence from data corresponding to visual perception input.

Applications such as machine vision and real-time-noisy environment-multiple-speaker voice understanding are required to accept a stream of input data (typically bytes) and to identify byte strings within that stream that satisfy a complex pattern. The input stream may be from external sources such as sensors, databases and communication lines, or from internal memory. Identifying a byte string in an external source stream that satisfies a pattern is called recognition; in an internal memory stream it is called recall.

Applications such as those mentioned above require both recognition and recall. For example, a sophisticated voice response system might be required to interpret vocalizations in one language (requiring recognition), then formulating an appropriate response in another (requiring recall). To perform such applications, a system must incorporate capabilities for both recognition and recall. Such a system needs an element for detecting byte strings that satisfy complex patterns; it should provide a connection between that element and external sources; it must incorporate internal memory of a capacity and configuration to support recall and provide a pathway between that internal memory and the byte string detection element; and it must incorporate a mechanism for control.

SUMMARY

According to the invention, a digital memory for recognition and recall in support of a host system comprises an architecture having a plurality of pattern processors, each of which has its own random access memory (RAM) and controller, an external data bus and external data bus controller, a results bus and results bus controller, an internal data bus and internal data bus controller, and an external control bus and external control bus and controller. In a preferred embodiment each of the pattern processors is a general purpose set theoretic processor (GPSTP) operating in interrupt and block modes. The system can load reference patterns from external sources or from its own RAM. The GPSTPs can scan subject matter data from external sources (recognition), and scan subject matter data from RAM (recall). All of the pattern memories can be used concurrently to scan incoming data to recognize qualifying strings or to retrieve stored data for recall. Alternatively some pattern memories can be employed for recognition at the same time others are used for recall. When used collectively all can be configured with the same reference pattern to multiply throughput speed or they can be configured separately to increase effective reference pattern capacity. The invention is preferably implemented in memory technology with the capacity of a terabyte on a single chip, a gigabyte of which being devoted to pattern processors and associated controllers with the remainder devoted to RAM. The invention can also be embodied as discrete modules comprising a single pattern processor with its accompanying RAM and controller. These modules can be combined to form a plurality that can approach the capacity of the preferred embodiment albeit at a significant cost in power requirement and heat dissipation.

The RAMs store a collection of reference patterns and reference pattern components not currently in use (i.e. not loaded into the pattern processor), subject matter data, knowledge ware (e.g., ontologies), and program instructions for the controllers.

The controllers command the pattern processors controlling their mode of operation, determining whether reference patterns are loaded from external sources or RAMs and whether subject matter data to be scanned is taken from external sources or from the RAMs. The controllers also control transfer of data between the RAMs and external media.

The external data bus and controller provide a pathway and mechanism for reference patterns to be loaded from external sources and for subject matter data from external sources to be scanned by the pattern processors. The external data bus and controllers also provide part of the pathway for transferring data to and from the RAMs and external sources.

The results bus and controller provide a pathway and mechanism for transferring results data from the RAMs to external media.

The external control bus and external control bus controller provide a mechanism for the coordinating the controllers associated with each pattern processors.

DETAILED DESCRIPTION

Figure 1:
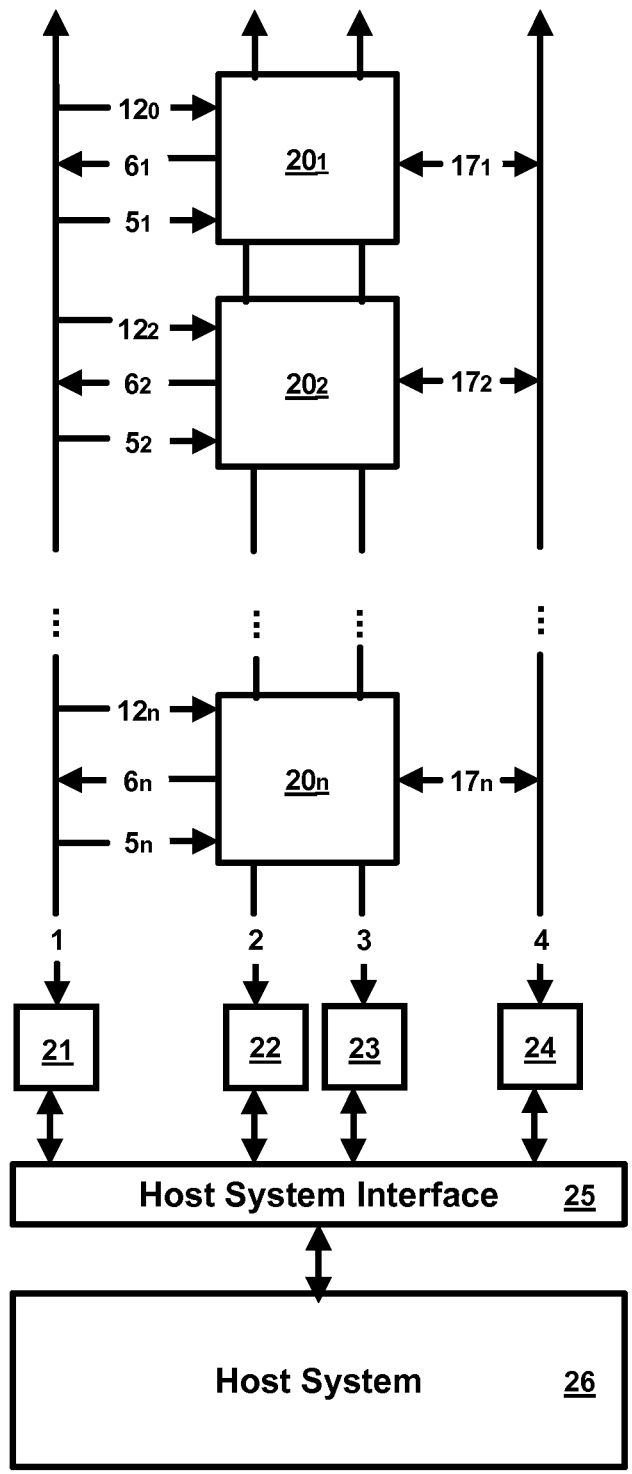
FIG. 1 is a block diagram of a device architecture according to the invention

The present invention is intended for use in support of a host through a host system interface. Referring to FIG. 1 showing a host system interface, the present invention comprises a plurality of building block units $20_{1-n}$ coupled to a host system interface 25 for a host system 26. The coupling is by means of an associated external data bus 1 with external data bus controller 21, a results bus 2 with a results bus controller 22, an internal data bus 3 with an internal data bus controller 23, and an external control bus 4 with and external control bus controller 24. In the preferred embodiment, many building block units $20_{1-n}$ are implemented on a single semiconductor chip.

Figure 2:
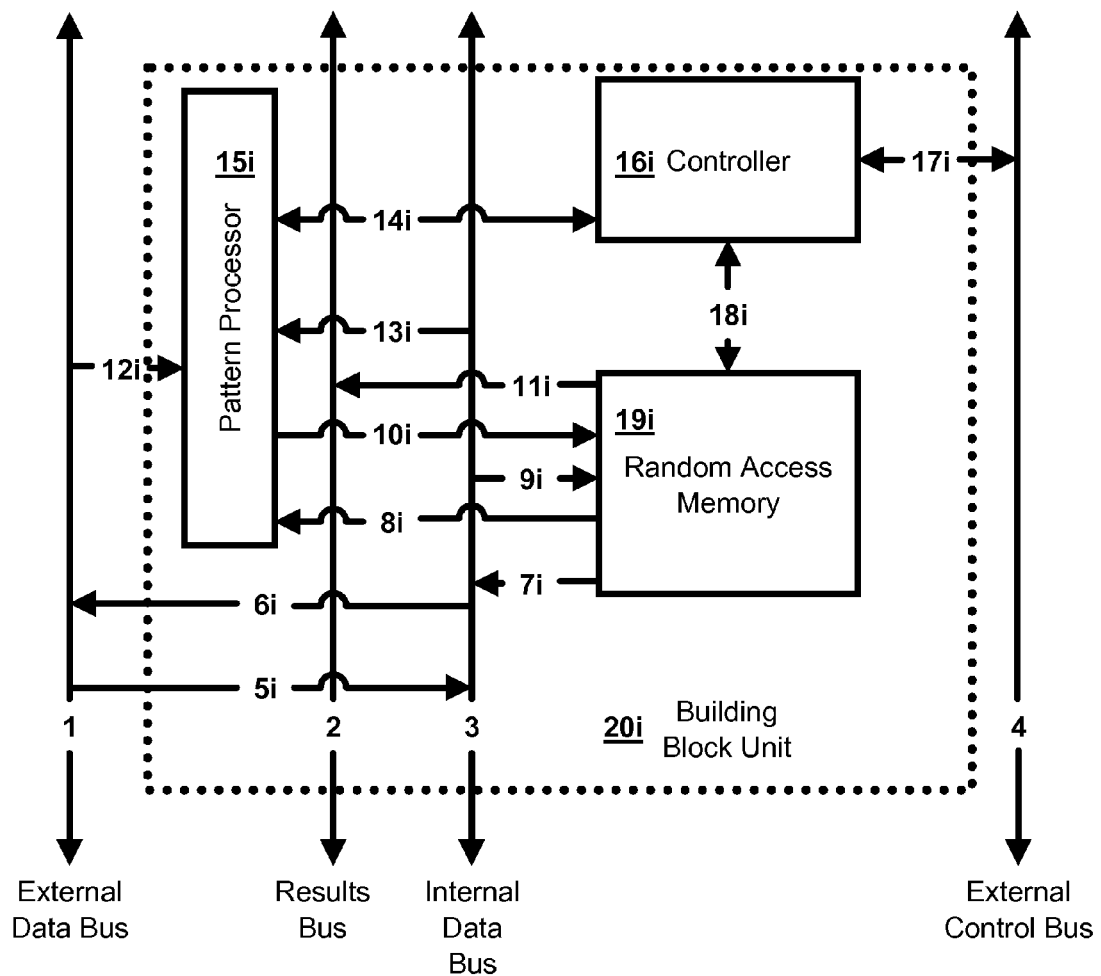
FIG. 2 is a block diagram of a building block unit according to the invention

Referring also to FIG. 2 each building block unit $20_i$ comprises a pattern processor $15_i$, a controller $16_i$, and a random access memory (RAM) $19_i$ with interconnections and functionality as hereinafter explained.

Pattern Processor

The pattern processor $15_i$ is a general purpose set theoretic processor (GPSTP) as described in U.S. Pat. Nos. 7,392,219, 7,487,131 and 7,774,286. (Other pattern processors may be substituted for some or all of the GPSTPs. Multiple kinds of pattern processors may be used if desired. For example GPSTPs specialized for auditory and visual data could be used in combination with the basic GPSTP pattern processor $15_i$ to create a multi-dimensional system.) Each GPSTP pattern processor $15_i$ is configured to detect data strings embedded in a body of subject matter data that satisfy a reference pattern. The reference pattern is said to "configure" the pattern processor $15_i$. The reference pattern is a cognate of a computer program in a conventional digital computer. It differs from a program however in that a program specifies a sequence of instructions while a reference pattern specifies a single-step systolic response.

Input (of both reference pattern and subject matter data) to the pattern processor $15_i$ is of byte serial form. The source of reference patterns for a pattern processor $15_i$ can be the host interface via the external data bus 1 and controller 21 via line $12_i$, the RAM $19_i$ in the same building block unit via line $8_i$, or a RAM $19_j$ (analogous to RAM $19_i$ but not shown) in a different building block unit via lines $7_j$ (analogous to $7_i$ but not shown), bus 3, and $13_i$. The source of subject matter data for a pattern processor $15_i$ can be the host interface via the external data bus 1 and controller 21 via line $12_i$ or the RAM $19_i$ in the same building block unit via line $8_i$.

The pattern processor $15_i$ can operate in two modes: Its results can be acted on and its state probed after each input byte is processed (interrupt mode), or it can process a number of bytes determined by the controller and have its state probed only when that number has been reached (block mode).

Random Access Memory

The RAM $19_i$ stores
reference patterns with which to configure the pattern processor $15_i$,
selected subject matter data identities and identities of the elements of the reference pattern that selected them
programs for the controller $16_i$ in its own building block unit
subject matter data
ontologies whose nodes are subject matter data, reference patterns, and reference pattern components Controller The controller $16_i$ is for example an x86 class processor or an equivalent general-purpose microcomputer processor. It controls the results bus 2 and the pattern processor $15_i$ in its own building block unit $20_i$. Its programs and working data are stored in the RAM $19_i$ in its own building block unit. The external control bus controller 24 (FIG. 1) controls the controller $16_i$ via the external control bus 4, commanding it to execute specific programs or program sequences, in effect instructing each building block unit the function to perform.

The controller $16_i$ configures the pattern processor $15_i$ in its own building block unit $20_i$ by commanding the pattern processor $15_i$ to load a reference pattern from the RAM $19_i$ into its own pattern processor $15_i$. It configures pattern processors $15_j$ (not shown but analogous to $15_i$) in building block units $20_j$ (not shown but analogous to $20_i$) other than its own by commanding each to load a reference pattern stored in the RAM $19_i$ into its own building block unit $20_i$.

Each building block unit controller $16_i$ issues commands to its own pattern processor $15_i$ to begin and end subject matter processing and to transfer the contents of its internal registers to the RAM in its own building block unit. Each building block unit controller $16_i$ controls only its own pattern processor $15_i$ for the purpose of processing subject matter data. The controller $16_i$ commands the RAM $19_i$ to transfer reference patterns, subject matter data, programs for its own operation, and knowledgeware from the host via the external data bus 1 and external data bus controller 21, and lines $5_i$, 3, and $9_i$. The controller $16_i$ commands the RAM $19_i$ to transfer portions of its contents, determined by command via the external control bus 4, to the host via lines $7_i$, 3 and $6_i$, and the external data bus 1 and controller 21.

External Data Bus and External Data Bus Controller

The external data bus 1 is a multi-channel bi-directional bus. Its purpose is to transfer reference patterns to the pattern processors $15_i$, to transfer subject matter data to the pattern processors $15_i$, and to synchronize multiple pattern processors $15_i$ receiving the same subject matter data stream. The external data bus 1 is also used to transfer reference patterns, subject matter data, controller programs and ontologies from the host system 26 to the RAM $19_i$ and to transfer the contents of the RAM $19_i$ to the host system 26. The external data bus controller $21_i$ controls the transfer of data over the external data bus 1.

Results Bus and Results Bus Controller

The line $11_i$ connects the RAM $19_i$ to the results bus 2 (FIG. 1) and thus to the host system 26 via the corresponding results bus controller 22 (FIG. 1). The local controller $16_i$ provides the address in the RAM $19_i$ and the length of results to be transferred to the host system 26 to the results bus controller 22. The results bus controller 22 controls transfer of results from the RAM $19_i$ to the host system 26.

Internal Data Bus and Internal Data Bus Controller

The internal data bus 3 is a bi-directional bus. Its purpose is to transfer data between the external data bus 1 and the components of the building block unit $19_i$, via local buses $5_i$ and $6_i$ among the components of the building block unit $20_i$, and from components of one building block unit $20_i$ to another $20_j$ (not shown but analogous to building block unit $20_i$).

External Control Bus and External Control Bus Controller

The external control bus 4 is a bi-directional bus that transmits commands from the host to controllers $16_i$ in the building block units $20_i$ and receives back status data. The external control bus 4 orchestrates the operation of all of the building block units $20_i$.

Operation
Pattern Processors

Each pattern processor $15_i$ is capable of independent operation. One may be loaded with a reference pattern while a second may scan a stream of external data while a third may scan the contents of a RAM $19_i$. Indeed, at any moment there may be a sequence of events that begins with a pattern processor $15_i$ scanning an external source and detecting a string that satisfies its reference pattern; that continues with reference patterns (determined by the satisfying string) being loaded into one or more pattern processors $15_i$ that proceed to scan the contents of some number of the RAMs $19_i$. The pattern processor $15_i$ can be used to recognize data strings in bodies of subject matter data from external sources or to recall data from the RAM $19_i$ in its own building block unit.

Recognizing Data Strings in Subject Matter Data from External Sources

To recognize data strings in subject matter data from external sources reference patterns are loaded into some or all of the pattern processors $15_m$-$15_n$. Different reference patterns are loaded into each pattern processors $15_i$ used; the composite formed by these reference patterns comprise a single "grand" reference pattern (with possibly many sub-patterns). The number of pattern processors $15_i$ used depends on the complexity of the composite reference pattern.

The reference patterns for this purpose can be loaded from the host system interface via the external data bus controller 21, external data bus 1, and line $12_i$. Alternatively the pattern processors $15_i$ can be loaded from the RAM $19_i$ in each of their building block units via line $8_i$. The former is a serial operation, the latter is a parallel operation.

When a composite reference pattern is loaded, the external data bus controller 21 commands the pattern processors $15_i$ loaded with the composite reference pattern to process subject matter data from the host system interface via the external data bus controller 21, the external data bus 1, and line $12_i$. Results from each pattern processor $15_i$ are routed to the RAM $19_i$ in its own building block unit via line $10_i$, and from there to the host system via line $11_i$, the results bus 2 and the results bus controller 22. Subject matter data from external sources are processed only in block mode.

A pattern processor $15_i$ can be configured with reference patterns from external sources, from the RAM $19_i$ in its own building block unit $20_i$, or from a RAM $19_j$ (not shown but analogous to RAM $19_i$) in another building block unit $20_j$ (not shown but analogous to unit $20_i$). Data are presented to the pattern processor $15_i$ one byte at a time.

To process subject matter data from external sources typically a set of pattern processors $15_i$ is configured, each with a different reference pattern. The external data bus 1 and external database controller 21 then stream subject matter data to the configured processors $15_i$ in block mode and dispose of results at the end of each block.

Recalling Data from RAM

To process subject matter data from a RAM $19_i$ within a building block unit the controller $16_i$ in that unit commands its pattern processor $15_i$ load a reference pattern from the RAM $19_i$ and then commands the pattern processor $15_i$ to process subject matter data from the RAM $19_i$. This can be done in either interrupt mode or block mode. The controller $16_i$ disposes of the results.

In order to process subject matter data from multiple RAMs according to the same purpose, multiple pattern processors $15_i$ are configured with the same reference pattern. The pattern processors $15_i$ then act in parallel to search for identical content across multiple RAMs.

Random Access Memory

Programs for the controller $16_i$ are stored in the RAM $19_i$. Controller $16_i$ programs are loaded into the RAM $19_i$ from external sources. Programs for the controller $16_i$ can also be loaded from one RAM $19_i$ to another.

Reference patterns to be used to configure pattern processors $15_i$ are stored in the RAM $19_i$. Reference patterns are loaded into the RAM $19_i$ from external sources. Subject matter data are stored in the RAM $19_i$. Subject matter data are loaded to the RAM $19_i$ from external sources Ontologies, or the formal representations of knowledge as sets of concepts within a domain of interest and the relationships between concepts, are stored in the RAM $19_i$. Ontologies are loaded to the RAM $19_i$ from external sources. Ontologies are used to formulate reference patterns from strings of subject matter data.

Controller

The building block unit controller $16_i$ configures the pattern processor $15_i$ in its own building block unit $20_i$ by commanding the pattern processor $15_i$ to load a reference pattern from the RAM $19_i$ in its own building block unit $20_i$. Each can configure pattern processors $15_j$ (not shown but analogous to $15_i$) in building block units $20_j$ (not shown but analogous to $20_i$) other than its own by commanding them to load a reference pattern stored in the RAM $19_i$ in its own building block unit $20_i$. Each building block unit controller $16_i$ issues commands to its own pattern processor $15_i$ to begin and end subject matter processing and to transfer the contents of its internal registers to the RAM in its own building block unit. However, each building block unit controller $16_i$ controls only its own pattern processor $15_i$ for the purpose of processing subject matter data.

The building block unit controller $16_i$ commands the RAM $19_i$ to transfer reference patterns, subject matter data, programs for its own operation, and knowledge ware from the host via the external data bus 1 and external data bus controller 21, and lines $5_i$, 3, and $9_i$. The controller $16_i$ commands the RAM $19_i$ to transfer portions of its contents, determined by command from the external control bus 4, to the host via lines $7_i$, 3, and $6_i$, and the external data bus 1 and controller 21.

The invention has been explained with respect to specific embodiments. Other embodiments will be evident to those of skill in the art. It is therefore not intended that the invention be limited, except as indicated by the appended claims.

What is claimed is:

1. A digital memory comprising:
   a plurality of building block units, each building block unit comprising:
      a pattern processor configured to perform independent operations, an internal random access memory (RAM) and an internal controller;
   an internal data bus and internal data bus controller coupled to the building block units;
   an external data bus and external data bus controller coupled to the building block units;
   a results bus and results bus controller coupled to the building block units; and
   an external control bus and external control bus controller coupled to the building block units;
   the external data bus, the results bus and the external control bus configured to couple to a host system interface, the digital memory comprising the building blocks providing for concurrent recognition of patterns from the external data bus and recall of patterns stored in the internal RAM in support of a host device.

2. The digital memory according to claim 1 the pattern processor comprising a general purpose set theoretic processor.

3. A system for detecting byte strings that satisfy a reference pattern, the system comprising:
- a plurality of building block units, each building block unit comprising:
  - a pattern processor, said pattern processor being configurable by reference patterns provided from an external source and operative to detect byte strings satisfying said reference patterns; and
  - a random access memory (RAM) for storing a plurality of said reference patterns, configured to recall a selected one of said reference patterns to said pattern processor, and configured to retain others of said reference patterns while said pattern processor is concurrently processing subject matter data;
- an external data bus controller that controls an external data bus, the external data bus controller coupled to the building block units and configured to provide reference patterns from a host device to the building block units, to further receive subject matter data to be scanned from an external source, and to provide said subject matter data to said pattern processors;
- a unidirectional results bus that is coupled to the building blocks and that is configured to provide results from the building block units to a host device; and
- a results bus controller for controlling the unidirectional results bus;
- wherein first selected building block units are operative to perform recall by detecting strings of bytes in subject matter data from a plurality of multiple internal sources concurrently with second selected building block units operative to perform recognition by detecting strings of bytes in subject matter data from an external source and to store results from its pattern processor in its corresponding RAM unit.

4. The system of claim 3, further comprising:
a host system interface coupled between the external data bus and results bus controllers and the host device.

5. The system of claim 3, further comprising:
an internal data bus coupling the building block units to each other; and
an internal data bus controller coupling the internal data bus with the host device.

6. The system of claim 3, wherein each building block unit further comprises a controller for configuring, with the reference patterns, the pattern processor of the respective building block unit, the system further comprising:
an external control bus for providing instructions to the controllers of the building block units; and
an external control bus controller coupling the external control bus with the host device.

7. The system of claim 3, wherein each pattern processor is capable of independent operation.

8. A method of responding to subject matter data using reference patterns, the method comprising:
receiving first reference patterns from a host device via an external data bus at a plurality of first selected building block units and storing said reference patterns in said first selected building block units;
pre-storing subject matter data in each RAM of second selected building block units;
pre-storing a plurality of reference patterns in each RAM of said second selected building block units;
causing the pattern processor in each of said second selected building block units to be configured with the reference patterns from its respective RAM;
first detecting, via the pattern processors in said first selected building block units, byte strings in the subject matter data from the host device that satisfy the reference patterns configuring those pattern processors and storing results of said first detecting in the RAMS of the first selected building block units; while concurrently
second detecting, via the pattern processors in second selected building block units, byte strings in the subject matter data from their respective RAMs that satisfy reference patterns configuring those pattern processors and storing results of the detecting in the RAMs of the second selected building block units; and
outputting results stored in the RAMs of the first selected building blocks on a results data bus to the host device.

9. The method of claim 8, further comprising:
loading different reference patterns into the respective pattern processors.

10. The method of claim 8, further comprising:
loading identical reference patterns into the respective pattern processors.

11. A method of responding to subject matter data using reference patterns, the method comprising:
storing reference patterns in internal random access memories of a plurality of building block units; thereafter
causing the reference patterns to configure the pattern processors of said building block units; thereafter
recognizing first byte strings in the subject matter data from external sources and concurrently recalling second byte strings from the internal random access memories by means of the pattern processors of the building block units for determining if the byte strings match the reference patterns; and
outputting results of the determining on a results data bus to the host device.

12. The method of claim 11, further comprising:
loading different reference patterns into the respective pattern processors.

13. The method of claim 11, further comprising:
loading identical reference patterns into the respective pattern processors.

* * * * *